United States Patent
Wang et al.

(10) Patent No.: US 11,398,195 B2
(45) Date of Patent: Jul. 26, 2022

(54) BACKLIGHT BRIGHTNESS PROCESSING METHOD AND SYSTEM, BACKLIGHT BRIGHTNESS ADJUSTMENT METHOD, STORAGE MEDIUM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Xuefeng Wang, Beijing (CN); Yukun Sun, Beijing (CN); Jinghua Miao, Beijing (CN); Lili Chen, Beijing (CN); Hao Zhang, Beijing (CN); Bin Zhao, Beijing (CN); Lixin Wang, Beijing (CN); Xi Li, Beijing (CN); Jianwen Suo, Beijing (CN); Wenyu Li, Beijing (CN); Jinbao Peng, Beijing (CN); Qingwen Fan, Beijing (CN); Yuanjie Lu, Beijing (CN); Yali Liu, Beijing (CN); Chenru Wang, Beijing (CN); Jiankang Sun, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 490 days.

(21) Appl. No.: 16/473,804

(22) PCT Filed: Oct. 31, 2018

(86) PCT No.: PCT/CN2018/112955
§ 371 (c)(1),
(2) Date: Jun. 26, 2019

(87) PCT Pub. No.: WO2019/179106
PCT Pub. Date: Sep. 26, 2019

(65) Prior Publication Data
US 2021/0358427 A1  Nov. 18, 2021

(30) Foreign Application Priority Data

Mar. 19, 2018 (CN) .......................... 201810225834.0

(51) Int. Cl.
G09G 3/34 (2006.01)
G09G 5/10 (2006.01)
H04N 9/31 (2006.01)

(52) U.S. Cl.
CPC ............. *G09G 3/3426* (2013.01); *G09G 5/10* (2013.01); *H04N 9/3194* (2013.01); *G09G 2320/0233* (2013.01); *G09G 2360/16* (2013.01)

(58) Field of Classification Search
None
See application file for complete search history.

(56) References Cited

U.S. PATENT DOCUMENTS

| 9,564,086 B2 | 2/2017 | Ye et al. | |
| 2007/0052840 A1* | 3/2007 | Okuno | H04N 5/2351 348/364 |

(Continued)

FOREIGN PATENT DOCUMENTS

| CN | 103996382 A | 8/2014 |
| CN | 105047145 A | 11/2015 |

(Continued)

OTHER PUBLICATIONS

International Search Report and Written Opinion dated Jan. 30, 2019 from State Intellectual Property Office of the P.R. China.

(Continued)

*Primary Examiner* — Amr A Awad
*Assistant Examiner* — Donna V Bocar
(74) *Attorney, Agent, or Firm* — Dilworth & Barrese, LLP.; Michael J. Musella, Esq.

(57) ABSTRACT

An image processing method, a backlight brightness adjustment method, an image processing system, and a computer readable storage medium are provided. The image processing method includes: acquiring a display image; dividing the display image to obtain one or more initial local regions; calculating an average brightness value of each of the one or more initial local regions respectively; acquiring an output image according to the average brightness value of each of the one or more initial local regions and the display image.

18 Claims, 4 Drawing Sheets

(56) References Cited

U.S. PATENT DOCUMENTS

| | | | |
|---|---|---|---|
| 2009/0115718 A1* | 5/2009 | Qiao | G09G 3/3611 |
| | | | 345/102 |
| 2018/0090052 A1* | 3/2018 | Marsh | G09G 3/001 |
| 2018/0357967 A1 | 12/2018 | Zha | |

FOREIGN PATENT DOCUMENTS

| | | |
|---|---|---|
| CN | 105513543 A | 4/2016 |
| CN | 107103886 A | 8/2017 |
| CN | 108389552 A | 8/2018 |
| JP | 2018233215 A | 10/2013 |

OTHER PUBLICATIONS

Peng, Bo, Research-of-Dynamic-LED-Backlight-Algorithm-for-Large-scale-LCD, Chinese Master Theses Full-Text Database, Information Science and Technology, No. 6, Jun. 15, 2014, pp. 8-13; ISSN: 1074-0246, Sections 2.2.3 and 2.3.1.

* cited by examiner

| 1_value | |
|---|---|
| Size | 90 |
| Element 0 | 0.8563702 |
| Element 1 | 0.8619807 |
| Element 2 | 0.8681622 |
| Element 3 | 0.8618583 |
| Element 4 | 0.8595431 |
| Element 5 | 0.8647456 |
| Element 6 | 0.8605422 |
| Element 7 | 0.8656303 |
| Element 8 | 0.8658508 |
| Element 9 | 0.857664 |
| Element 10 | 0.8562759 |
| Element 11 | 0.8595549 |
| Element 12 | 0.8590236 |
| Element 13 | 0.8551651 |
| Element 14 | 0.8584675 |
| Element 15 | 0.8548795 |
| Element 16 | 0.8622812 |
| Element 17 | 0.8562928 |
| Element 18 | 0.7761285 |
| Element 19 | 0.7670195 |
| Element 20 | 0.7661163 |
| Element 21 | 0.7708144 |
| Element 22 | 0.7661742 |
| Element 23 | 0.7665722 |
| Element 24 | 0.7673242 |
| Element 25 | 0.7825264 |
| Element 26 | 0.7672359 |
| Element 27 | 0.4089204 |
| Element 28 | 0.3800046 |
| Element 29 | 0.3788944 |
| Element 30 | 0.3836411 |

P1 : 0.8627
P2 : 0.8627
P3 : 0.8667
P4 : 0.4078
P5 : 0.3804
P6 : 0.3804

BACKLIGHT BRIGHTNESS PROCESSING METHOD AND SYSTEM, BACKLIGHT BRIGHTNESS ADJUSTMENT METHOD, STORAGE MEDIUM

The present application claims priority of Chinese Patent Application No. 201810225834.0, filed on Mar. 19, 2018, the disclosure of which is incorporated herein by reference in its entirety as part of the present application.

TECHNICAL FIELD

The embodiments of the present disclosure relate to a backlight brightness processing method, a backlight brightness adjustment method, a backlight brightness processing system, and a computer readable storage medium.

BACKGROUND

A liquid crystal display (LCD) device has advantages of long life, fast response speed, small volume, low radiation, etc., and has been widely used in electronic devices such as a notebook computer, a mobile phone, and a liquid crystal television. The liquid crystal display device is a passive light emitting device, and mainly comprises a liquid crystal display panel and a backlight source. The liquid crystal display panel itself does not emit light, but relies on the backlight source to provide a light source.

SUMMARY

At least one embodiment of the present disclosure provides a backlight brightness processing method, and the backlight brightness processing method comprises: acquiring a display image; dividing the display image to obtain one or more initial local regions; calculating an average brightness value of each of the one or more initial local regions respectively; and acquiring an output image according to the average brightness value of each of the one or more initial local regions and the display image.

For example, in the backlight brightness processing method provided by an embodiment of the present disclosure, acquiring the output image according to the average brightness value of each of the one or more initial local regions and the display image comprises: creating a brightness pixel image according to a quantity of the one or more initial local regions; storing the average brightness value of each of the one or more initial local regions in the brightness pixel image respectively; and composing the brightness pixel image and the display image to obtain the output image.

For example, in the backlight brightness processing method provided by an embodiment of the present disclosure, a texture type of the display image is a render texture type, composing the brightness pixel image and the display image to obtain the output image comprises: converting the texture type of the display image to obtain an intermediate display image, a texture type of the intermediate display image being a two-dimensional texture type; acquiring an intermediate composite region of the intermediate display image; and covering the brightness pixel image on the intermediate composite region to obtain the output image.

For example, in the backlight brightness processing method provided by an embodiment of the present disclosure, a size of the intermediate composite region is the same as a size of the brightness pixel image.

For example, in the backlight brightness processing method provided by an embodiment of the present disclosure, a texture type of the display image is a two-dimensional texture type, composing the brightness pixel image and the display image to obtain the output image comprises: acquiring an initial composite region of the display image; covering the brightness pixel image on the initial composite region to obtain the output image.

For example, in the backlight brightness processing method provided by an embodiment of the present disclosure, a size of the initial composite region is the same as a size of the brightness pixel image.

For example, in the backlight brightness processing method provided by an embodiment of the present disclosure, the brightness pixel image comprises one or more brightness pixels, storing the one or more average brightness values in the brightness pixel image respectively comprises: sequentially filling the one or more average brightness values into the one or more brightness pixels.

For example, in the backlight brightness processing method provided by an embodiment of the present disclosure, sequentially filling the one or more average brightness values into the one or more brightness pixels comprises: taking the one or more average brightness values as grayscale values of respective sub-pixels of the one or more brightness pixels respectively, and sequentially filling the one or more average brightness values into the respective sub-pixels of the one or more brightness pixels.

For example, in the backlight brightness processing method provided by an embodiment of the present disclosure, a texture type of the display image is a render texture type, calculating one or more average brightness values of the one or more initial local regions respectively comprises: converting the texture type of the display image to obtain an intermediate display image, a texture type of the intermediate display image being a two-dimensional texture type; dividing the intermediate display image according to the display image and the one or more initial local regions to obtain one or more intermediate local regions of the intermediate display image, the one or more initial local regions being in one-to-one correspondence with the one or more intermediate local regions; and calculating an intermediate average brightness value of each of the one or more intermediate local regions respectively, and the intermediate average brightness value of each of the one or more intermediate local regions being the average brightness value of each of the one or more initial local regions.

For example, in the backlight brightness processing method provided by an embodiment of the present disclosure, the intermediate display image comprises a plurality of intermediate pixels, calculating the intermediate average brightness value of each of the one or more intermediate local regions respectively comprises: acquiring intermediate pixel brightness values of respective intermediate pixels in each intermediate local region; and calculating the intermediate average brightness value corresponding to each intermediate local region according to the intermediate pixel brightness values of the respective intermediate pixels in each intermediate local region.

For example, in the backlight brightness processing method provided by an embodiment of the present disclosure, each of the plurality of intermediate pixels comprises a red sub-pixel, a green sub-pixel, and a blue sub-pixel, a calculation formula of the intermediate pixel brightness value corresponding to each of the plurality of intermediate pixels is: $L=0.30 \times r + 0.59 \times g + 0.11 \times b$, where r represents a grayscale value of the red sub-pixel of each of the plurality of intermediate pixels, g represents a grayscale value of the green sub-pixel of each of the plurality of intermediate pixels, b represents a grayscale value of the blue sub-pixel of each of the plurality of intermediate pixels, and L represents the intermediate pixel brightness value corresponding to each of the plurality of intermediate pixels.

For example, in the backlight brightness processing method provided by an embodiment of the present disclosure, calculating the intermediate average brightness value corresponding to each intermediate local region according to the intermediate pixel brightness values of the respective intermediate pixels in each intermediate local region comprises: averaging the intermediate pixel brightness values of all intermediate pixels in each intermediate local region to obtain the intermediate average brightness value corresponding to each intermediate local region; or selecting N intermediate pixels in each intermediate local region, averaging the intermediate pixel brightness values of the N intermediate pixels selected in each intermediate local region to obtain the intermediate average brightness value corresponding to each intermediate local region, where N is a positive integer, and is less than a quantity of all intermediate pixels in each intermediate local region.

For example, in the backlight brightness processing method provided by an embodiment of the present disclosure, a texture type of the display image is a two-dimensional texture type, calculating the average brightness value of each of the one or more initial local regions respectively comprises: acquiring initial pixel brightness values of a plurality of initial pixels in each initial local region; and calculating the average brightness value corresponding to each initial local region according to the initial pixel brightness values of the plurality of initial pixels in each initial local region.

For example, in the backlight brightness processing method provided by an embodiment of the present disclosure, calculating the average brightness value corresponding to each initial local region according to the initial pixel brightness values of the plurality of initial pixels in each initial local region comprises: averaging the initial pixel brightness values of all initial pixels in each initial local region to obtain the average brightness value corresponding to each initial local region; or selecting N initial pixels in each initial local region, averaging the initial pixel brightness values of the N initial pixels selected in each initial local region to obtain the average brightness value corresponding to each initial local region, where N is a positive integer, and is less than a quantity of all initial pixels in each initial local region.

For example, in the backlight brightness processing method provided by an embodiment of the present disclosure, a size of each of the one or more initial local regions is variable.

At least one embodiment of the present disclosure provides a backlight brightness adjustment method, comprising: in a rendering engine: performing the backlight brightness processing method according to any one of the above embodiments; in a display: processing the output image by the display to obtain the average brightness value of each of the one or more initial local regions; adjusting backlight brightness of the display according to the average brightness value of each of the one or more initial local regions; and displaying the output image.

For example, in the backlight brightness adjustment method provided by an embodiment of the present disclosure, the display is a virtual reality display or an augmented reality display.

At least one embodiment of the present disclosure provides a backlight brightness processing system, comprising: an image acquisition device, configured to acquire a display image; a memory, configured to store non-transitory computer readable instructions; a processor, configured to execute the non-transitory computer readable instructions, when the non-transitory computer readable instructions are executed by the processor, the backlight brightness processing method according to any one of the above embodiments is performed.

At least one embodiment of the present disclosure provides a computer readable storage medium, used for storing non-transitory computer readable instructions, when the non-transitory computer readable instructions are executed by a computer, the backlight brightness processing method according to any one of the above embodiments is performed.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

Figure 1:
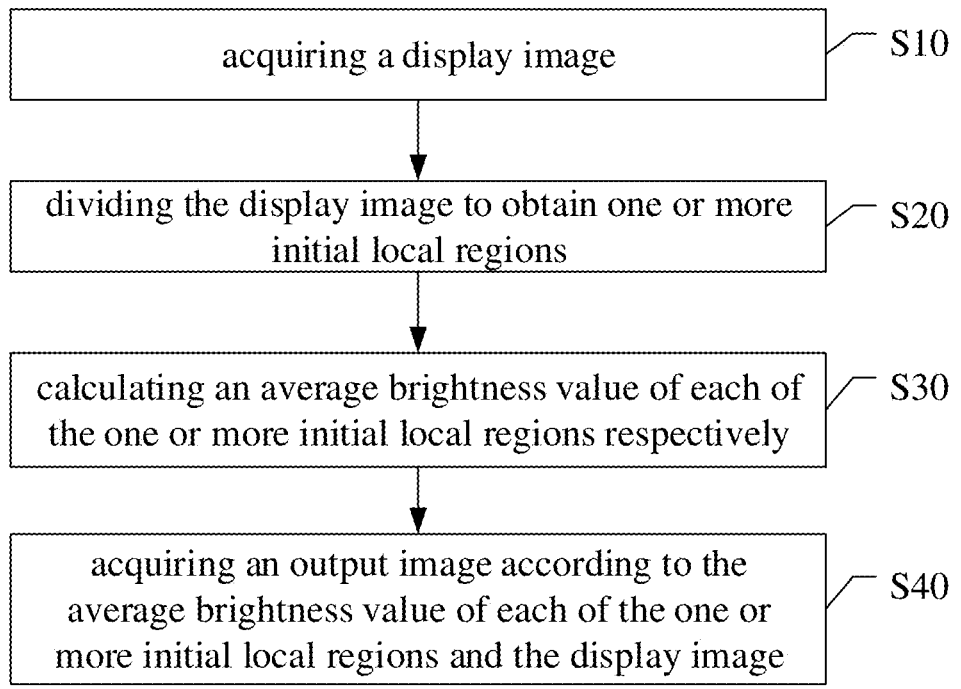
FIG. 1 is a schematic flowchart of a backlight brightness processing method according to an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In order to make the following descriptions of the embodiments of the present disclosure clear and concise, the present disclosure omits detailed descriptions of known functions and known components.

At present, in a liquid crystal display device, on one hand, because a backlight source needs to consume relative much energy, thus reducing the power consumption of the backlight source also reduces the power consumption of the entire liquid crystal display device; on the other hand, because an image displayed on the liquid crystal display panel has light and shade changes, if the brightness of the backlight source remains unchanged during a display process, the saturation and contrast of the image displayed will be reduced, thereby affecting the display effect.

Methods for reducing the power consumption of the backlight source include improving a driving circuit of the backlight source, improving a luminous efficiency of the backlight source, developing a new type of backlight source, and local dimming, and the like. Local dimming can use a backlight lamp including hundreds of light-emitting diodes (LED) to replace a backlight lamp of cold cathode fluorescent lamp (CCFL), local brightness adjustment can be performed on the backlight lamp consisting of LED according to the light and shade of the image, thereby increasing the brightness of a brighter portion of the display image and reducing the brightness of a darker portion of the display image, so as to improve the contrast of the display image.

Embodiments of the present disclosure provide a backlight brightness processing method based on rendering engine, a backlight brightness adjustment method, a backlight brightness processing system, and a computer readable storage medium, the calculation of the average brightness values of the local regions are implemented in the rendering engine, the average brightness values of the local regions are transmitted to a hardware device together with an original image, thereby reducing power consumption, improving contrast, achieving real-time sampling and transmitting of the image, and satisfying the requirement of processing a large amount of data in real time in virtual reality technology.

Several embodiments of the present disclosure are described in detail below with reference to the accompanying drawings, but the present disclosure is not limited to these specific embodiments.

FIG. 1 is a schematic flowchart of a backlight brightness processing method according to an embodiment of the present disclosure.

For example, as shown in FIG. 1, a backlight brightness processing method based on rendering engine provided by an embodiment of the present disclosure may include, but is not limited to, the following steps:

S10: acquiring a display image;
S20: dividing the display image to obtain one or more initial local regions;
S30: calculating an average brightness value of each of the one or more initial local regions respectively;
S40: acquiring an output image according to the average brightness value of each of the one or more initial local regions and the display image.

For example, in the backlight brightness processing method, the calculation of local backlight brightness values can be implemented in the rendering engine, that is, implemented in the software of the host, so that the backlight brightness processing method has the characteristics of editability and high flexibility. At the same time, the backlight brightness processing method does not need to add a chip on the hardware end (for example, the display end), thereby reducing the weight of the hardware end. For virtual reality (VR) display, the rendering engine can create a virtual space in which a currently captured display image can be processed, and then the processed display image is transmitted to the display device for display, thereby achieving real-time sampling and transmitting of the image, and satisfying the requirement of processing a large amount of data in real time in the VR technology.

For example, in the backlight brightness processing method, a period of backlight brightness processing can be set according to actual application. For example, a processing period of backlight brightness processing can be one frame or a plurality of frames, or the processing period of backlight brightness processing can be a preset time period (for example, 1 second, 5 seconds, ect.). In a case where a brightness difference of adjacent two frame display images or adjacent several frame display images is relatively large, the processing period of backlight brightness processing may be small (for example, one frame), thereby adjusting the local backlight brightness of each frame in real time, and improving the display effect. In a case where the brightness difference of adjacent two frame display images or adjacent several frame display images is relatively small, the processing period of backlight brightness processing may be large (for example, one second), thereby reducing the calculation amount of the rendering engine.

For example, in some embodiments, in the step S10, a current scene can be sampled by a camera to obtain the display image, and then the display image is saved. For example, the display image can be saved in a graphics processing unit (GPU).

For example, a texture type of the display image is a render texture type. An image format of the display image is ARGB32, and a size of the display image can be 1080×1200. It should be noted that, the present disclosure is not limited thereto, the image format, the texture type, the size, and the like of the display image may be set according to actual conditions.

For example, in some other embodiments, in the step S10, a current scene can be sampled by a camera to obtain an original image, and then the original image is processed to obtain the display image, and the texture type of the display image is a two-dimensional texture (Texture2D) type.

For example, the display image may be a color image or a grayscale image.

For example, the display image can have a variety of different shapes, such as a rectangle, a circle, a trapezoid, and the like.

For example, in the step S20, the display image may be divided according to the size, light and shade change relationship, and the like of the display image to obtain one or more initial local regions.

For example, in a case where the display image is divided into a plurality of initial local regions, sizes of the plurality of initial local regions may be the same or different. For example, in a portion of the display image where changes in light and shade are relatively large, the size of the initial local region may be relatively small; and in a portion of the display image where the changes in light and shade are relatively small, the size of the initial local region may be relatively large.

For example, in the embodiment of the present disclosure, the sizes of the plurality of initial local regions can be controlled in real time. That is, the sizes of the plurality of initial local regions are variable. In the step S20, programming operations can be performed in the rendering engine, and the display image can be re-divided according to actual needs to obtain different initial local regions, thereby improving flexibility of the backlight brightness processing. For example, according to actual application requirements, a user can input different initial local region sizes through a user interface, so as to control the size of each initial local region.

For example, in an example, the size of the display image can be 1080×1200, the display image may be divided into 9×10 initial local regions, and sizes of the 9×10 initial local regions are the same and all are 120×120.

For example, in one example, in a case where the texture type of the display image is a render texture type, the step S30 may comprise:

S301: converting the texture type of the display image to obtain an intermediate display image;

S302: dividing the intermediate display image according to the display image and the one or more initial local regions to obtain one or more intermediate local regions of the intermediate display image, the one or more initial local regions being in one-to-one correspondence with the one or more intermediate local regions; and S303: calculating one or more intermediate average brightness values of the one or more intermediate local regions respectively, and the one or more intermediate average brightness values of the one or more intermediate local regions being the one or more average brightness values of the one or more initial local regions.

For example, in the step S301, a texture type of the intermediate display image is a two-dimensional texture (texture2D) type. Because the texture type of the display image is the render texture type, and the information of each pixel cannot be read in the render texture type, so the texture type of the display image can be converted into the texture2D type, so as to facilitate to read the brightness information of each pixel.

For example, the intermediate display image is stored in a central processing unit (CPU).

It should be noted that, in some examples, the difference between the intermediate display image and the display image is only that the texture type is different, the other information (for example, displayed content, etc.) of the intermediate display image and the display image is the same. In some other examples, the size and the texture type of the intermediate display image and the size and the texture type of the display image are different, and the other information (for example, displayed content, etc.) of the intermediate display image and the display image is the same, for example, the size of the display image is M×N, the size of the intermediate display image is M/T×N/T, M and N are positive integers, and T is a positive number, in a case where T is greater than 1, the size of the intermediate display image is larger than the size of the display image, and in a case where T is less than 1, the size of the intermediate display image is smaller than the size of the display image, that is, in a case where the size of the intermediate display image and the size of the display image are different, the display image may be enlarged or reduced in proportion to obtain the intermediate display image; in a case where T is equal to 1, the size of the intermediate display image is same as the size of the display image.

For example, in the step S302, the intermediate display image is divided according to a correspondence relationship between the intermediate display image and the display image and a division method of the initial local regions in the display image, so as to obtain the one or more intermediate local regions of the intermediate display image. For example, in some embodiments, the size of the intermediate display image and the size of the display image are the same, that is, if the size of the display image may be 1080×1200, the size of the intermediate display image may also be 1080×1200, thereby ensuring that sizes of the respective intermediate local regions and sizes of the respective initial local regions are respectively the same and in one-to-one correspondence.

For example, an image format of the intermediate display image and the image format of the display image are also the same, that is, if the image format of the display image is ARGB32, the image format of the intermediate display image is also ARGB32.

For example, the intermediate display image may comprise a plurality of intermediate pixels. In one example, each of the plurality of intermediate pixels can comprise three sub-pixels, and the three sub-pixels are a red sub-pixel, a green sub-pixel, and a blue sub-pixel, respectively. The present disclosure does not limit this, and each of the plurality of intermediate pixels can also comprise four sub-pixels (for example, four sub-pixels of red, green, blue and white).

It should be noted that, "intermediate pixel" means a pixel in the intermediate display image.

For example, in the step S303, the one or more initial local regions are in one-to-one correspondence with the one or more average brightness values respectively, the one or more intermediate local regions are in one-to-one correspondence with the one or more intermediate average brightness values, and the one or more intermediate average brightness values are the one or more average brightness values.

For example, in the step S303, the degree of the light and shade of the display image can be reflected by the brightness information of respective pixels on the display image, so the brightness information of each intermediate local region can be obtained by acquiring the brightness information of intermediate pixels in each intermediate local region. For example, the step S303 may comprise:

S3031: acquiring intermediate pixel brightness values of respective intermediate pixels in each intermediate local region; and S3032: calculating an intermediate average brightness value corresponding to each intermediate local region according to the intermediate pixel brightness values of the respective intermediate pixels in each intermediate local region.

It should be noted that, "intermediate pixel brightness value" represents a brightness value of the intermediate pixel.

For example, in the step S3031, an intermediate pixel brightness value corresponding to each intermediate pixel can be calculated according to a brightness formula between color (RGB) and brightness, for example, a calculation formula of an intermediate pixel brightness value corresponding to each of the plurality of intermediate pixels may be:

$$L=0.30\times r+0.59\times g+0.11\times b,$$

where r represents a grayscale value of the red sub-pixel of an intermediate pixel, g represents a grayscale value of the green sub-pixel of the intermediate pixel, b represents a grayscale value of the blue sub-pixel of the intermediate pixel, and L represents the intermediate pixel brightness value corresponding to the intermediate pixel. Because light of different colors have different wavelengths, and degrees of sensitivity of human eyes to colors are different, the degrees of sensitivity of human eyes to a blue sub-pixel and a red sub-pixel are less than the degree of sensitivity of human eyes to a green sub-pixel, therefore, the intermediate pixel brightness value corresponding to an intermediate pixel is calculated according to different ratios of brightness values of the respective sub-pixels of the intermediate pixel, so that the visual brightness of the intermediate pixel can be better reflected, and the display effect is improved.

It should be noted that, the calculation formula of the intermediate pixel brightness value of each intermediate pixel may be adjusted according to the colors of respective sub-pixels in the intermediate pixel, for example, the user can edit the calculation formula of the intermediate pixel brightness value through the user interface (for example, changing the coefficient in the calculation formula, etc.) to adjust the calculation formula of the intermediate pixel brightness value according to the colors of the respective sub-pixels of the intermediate pixel.

Figure 2:
FIG. 2 is a schematic diagram of a display image according to an embodiment of the present disclosure.
Figures 3, 4:
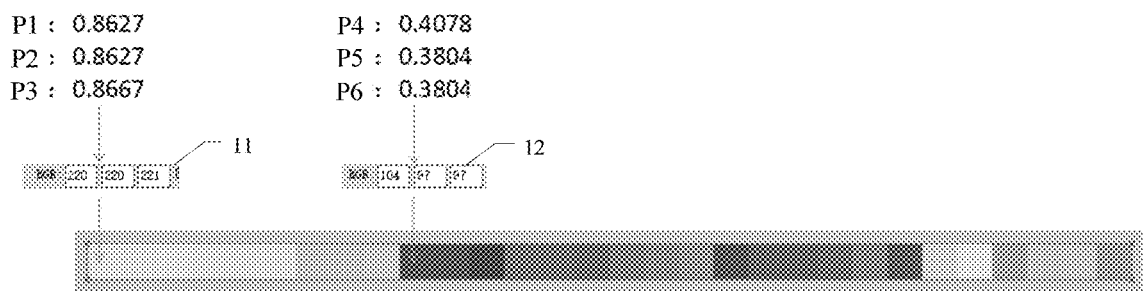
FIG. 3 is a schematic diagram showing a calculation result of average brightness values of a part of initial local regions in the display image shown in FIG. 2.
FIG. 4 is a schematic diagram of a brightness pixel image according to an embodiment of the present disclosure.

FIG. 2 is a schematic diagram of a display image according to an embodiment of the present disclosure, FIG. 3 is a schematic diagram showing a calculation result of average brightness values of a part of initial local regions in the display image shown in FIG. 2.

For example, a size of the display image shown in FIG. 2 may be 1080×1200, and the display image is divided into 9×10 initial local regions. FIG. 3 shows average brightness values of 30 initial local regions in the 9×10 initial local regions.

For example, in the rendering engine, a grayscale value of a sub-pixel is a normalized value, that is, the grayscale value of the sub-pixel is represented by float type data of 0-1, and therefore, as shown in FIG. 3, the average brightness value of the initial local region is also represented by float type data of 0-1.

For example, in some examples, the step S3032 may comprise: averaging intermediate pixel brightness values of all intermediate pixels in each intermediate local region to obtain the intermediate average brightness value corresponding to each intermediate local region. For example, in each intermediate local region, after calculating to obtain the intermediate pixel brightness value of each intermediate pixel, the intermediate pixel brightness values of all intermediate pixels in the intermediate local region may be averaged to obtain the intermediate average brightness value corresponding to the intermediate local region.

For example, in some other examples, the step S3032 may comprise: selecting N intermediate pixels in each intermediate local region, and averaging intermediate pixel brightness values of the N intermediate pixels selected in each intermediate local region to obtain the intermediate average brightness value corresponding to each intermediate local region, where N is a positive integer, and is less than a quantity of all intermediate pixels in each intermediate local region. For example, according to pixel brightness values of respective intermediate pixels in an intermediate local region, the N intermediate pixels in the intermediate local region may be selected, intermediate pixel brightness values of the selected N intermediate pixels are obtained, and then the intermediate pixel brightness values of the selected N intermediate pixels are averaged, so as to obtain an intermediate average brightness value of the intermediate local region.

It should be noted that, in each intermediate local region, the number, positions, and the like of the selected intermediate pixels may be determined according to actual needs, the numbers of the selected intermediate pixels in respective intermediate local regions may be the same or different, and the present disclosure is not limited thereto.

For example, in an example, an intermediate average brightness value of an intermediate local region may be an arithmetic average value of intermediate pixel brightness values of all intermediate pixels or intermediate pixel brightness values of selected intermediate pixels in the intermediate local region, thereby simplifying the calculation process and increasing the calculation speed. Therefore, in the step S3032, a calculation formula of the intermediate average brightness value of each intermediate local region may be:

$$L' = \frac{\sum_{i=1}^{n} L_i}{n}$$

where, L' represents an intermediate average brightness value of an intermediate local region, $L_i$ represents an intermediate pixel brightness value of an i-th intermediate pixel of the intermediate local region, in a case where the intermediate average brightness value of the intermediate local region is an average value of intermediate pixel brightness values of all intermediate pixels in the intermediate local region, n represents the number of all intermediate pixels in the intermediate local region, in a case where the intermediate average brightness value of the intermediate local region is an average value of intermediate pixel brightness values of selected intermediate pixels in the intermediate local region, n represents the number of the selected intermediate pixels in the intermediate local region, i and n both are positive integers, and $1 \leq i \leq n$.

It should be noted that, the intermediate average brightness value of the intermediate local region may also be a geometric average value, a weighted average value, and the like of the intermediate pixel brightness values of all intermediate pixels or intermediate pixel brightness values of selected intermediate pixels in the intermediate local region, which is not limited in the present disclosure.

For example, in the step S3032, the backlight brightness processing method provided by the embodiments of the present disclosure may further include an operation of filtering the intermediate pixel brightness values of the intermediate pixels, so as to remove noise information in the intermediate pixel brightness values and obtain more accurate intermediate pixel brightness values. For example, if an absolute value of a difference between an intermediate pixel brightness value of an intermediate pixel and an intermediate pixel brightness value of each adjacent intermediate pixel is greater than a preset threshold, the intermediate pixel brightness value of the intermediate pixel may belong to noise information. The preset threshold can be determined according to the actual application, and the present disclosure does not limit this.

For example, in some other examples, in a case where the texture type of the display image is the texture2D type, the step S30 may comprise:

S311: acquiring initial pixel brightness values of a plurality of initial pixels in each initial local region; and S312: calculating an average brightness value corresponding to each initial local region according to the initial pixel brightness values of the plurality of initial pixels in each initial local region.

For example, the step S312 may comprise: averaging initial pixel brightness values of all initial pixels in each initial local region to obtain the average brightness value corresponding to each initial local region. Or, the step S312 may also comprise: selecting N initial pixels in each initial local region, and averaging initial pixel brightness values of the N initial pixels selected in each initial local region to obtain the average brightness value corresponding to each initial local region. For example, N is a positive integer, and is less than a quantity of all initial pixels in each initial local region.

It should be noted that, "initial pixel" represents a pixel in the display image, and "initial pixel brightness value" represents a brightness value of an initial pixel. In addition, in this example, an operation process of calculating the average brightness value corresponding to the initial local region according to the initial pixels in the step S311 and the step S312 is similar to an operation process of calculating the intermediate average brightness value corresponding to the intermediate local region according to the intermediate pixels described above, and the repetitions are not described here again.

For example, in each initial local region, the plurality of initial pixels are in one-to-one correspondence to the plurality of initial pixel brightness, that is, one initial pixel corresponds to one initial pixel brightness.

It should be noted that, in the present disclosure, the plurality of initial local regions are in one-to-one correspondence to the plurality of average brightness values, namely one initial local region corresponds to only one average brightness value. The plurality of intermediate local regions are in one-to-one correspondence to the plurality of intermediate average brightness values, that is, one intermediate local region corresponds to only one intermediate average brightness value. If the display image comprises W initial local regions, the W initial local regions correspond to W average brightness values, and a first initial local region corresponds to a first average brightness value, a second initial local region corresponds to a second average brightness value, and so on, and a W-th initial local region corresponds to a W-th average brightness value. Similarly, if the number of the plurality of intermediate local regions is also W, a first intermediate local region corresponds to a first intermediate average brightness value, a second intermediate local region corresponds to a second intermediate average brightness value, and so on, and a W-th intermediate local region corresponds to a W-th intermediate average brightness value. Similarly, the correspondence between the plurality of intermediate pixels and the plurality of intermediate pixel brightness values, the correspondence between the plurality of initial pixels and the plurality of initial pixel brightness values are also similar to the correspondence between the plurality of initial local regions and the plurality of average brightness values, and details are not described herein again.

For example, the step S40 may comprise the following steps:

S401: creating a brightness pixel image according to a quantity of the one or more initial local regions;

S402: storing the one or more average brightness values of the one or more initial local regions in the brightness pixel image respectively; and S403: composing the brightness pixel image and the display image to obtain the output image.

For example, in the step S401, a texture type of the brightness pixel image may be a texture2D type.

For example, the brightness pixel image may comprise one or more brightness pixels, and the one or more brightness pixels may be arranged in one row and a plurality of columns, a plurality of rows and one column, or a plurality of rows and a plurality of columns, or the like. The present disclosure is not limited thereto. It should be noted that, "brightness pixel" represents a pixel in the brightness pixel image.

For example, the number of brightness pixels in the brightness pixel image may be less than the number of initial local regions; alternatively, the number of brightness pixels in the brightness pixel image may be equal to the number of initial local regions.

For example, the step S402 may comprise: sequentially filling the one or more average brightness values into the one or more brightness pixels.

For example, respective sub-pixels in each brightness pixel may store the average brightness value of the same initial local region, so that the number of the brightness pixels in the brightness pixel image may be equal to the number of initial local regions. For another example, the respective sub-pixels in each brightness pixel may respectively store average brightness values of different initial local regions, such that the number of brightness pixels in the brightness pixel image may be less than the number of initial local regions.

For example, in an example, in a case where the number of brightness pixels in the brightness pixel image is less than the number of initial local regions, sequentially filling the one or more average brightness values into the one or more brightness pixels comprises: taking the one or more average brightness values as grayscale values of sub-pixels of the respective brightness pixels respectively, and sequentially filling the one or more average brightness values into the sub-pixels of the one or more brightness pixels.

For example, if the brightness pixel comprises three sub-pixels, each brightness pixel may comprise average brightness values of three initial local regions, thereby reducing the size of the brightness pixel image. For example, in a case where the display image is divided into 9×10 initial local regions, the number of average brightness values of the initial local regions is 90, and the number of the brightness pixels in the brightness pixel image may be 30.

FIG. 4 is a schematic diagram of a brightness pixel image according to an embodiment of the present disclosure.

For example, in an example, as shown in FIG. 4, the brightness pixels in the brightness pixel image are arranged in a row and a plurality of columns. Each brightness pixel comprises three sub-pixels (for example, a red sub-pixel, a blue sub-pixel and a green sub-pixel). FIG. 4 shows two brightness pixels, which are a first brightness pixel 11 and a second brightness pixel 12 respectively, in the brightness pixel image.

For example, FIG. 4 shows average brightness values of six initial local regions, an average brightness value of a first initial local region P1 is 0.8627, an average brightness value of a second initial local region P2 is 0.8627, an average brightness value of a third initial local region P3 is 0.8667, an average brightness value of a fourth initial local region P4 is 0.4078, an average brightness value of a fifth initial local region P5 is 0.3804, and an average brightness value of a sixth initial local region P6 is 0.3804.

For example, as shown in FIG. 4, the average brightness value of the first initial local region P1, the average brightness value of the second initial local region P2, and the average brightness value of the third initial local region P3 are respectively filled into three sub-pixels of the first brightness pixel 11, the average brightness value of the fourth initial local region P4, the average brightness value of the fifth initial local region P5, and the average brightness value of the sixth initial local region P6 are respectively filled into three sub-pixels of the second brightness pixel 12.

For example, in the step S402, firstly, a plurality of average brightness values corresponding to the plurality of initial local regions are converted into grayscale values of the sub-pixels, and then are filled into the sub-pixels.

For example, in the step S402, for 8-bit color (8 bit) displays (that is, each color is represented by 8 bit), a grayscale value of a sub-pixel ranges from 0 to 255. As shown in FIG. 4, in the 8-bit display, the average brightness value of the first initial local region P1 is 0.8627, then a grayscale value of a sub-pixel of the first brightness pixel 11 is 0.8627×255≈220. The calculation process of the grayscale values of the other sub-pixels is similar to the above calculation process. Therefore, as shown in FIG. 4, grayscale values of respective sub-pixels in the first brightness pixel 11 are 220, 220, and 221, respectively; grayscale values of respective sub-pixels in the second brightness pixel 12 are 104, 97, and 97, respectively It should be noted that, in the process of calculating the grayscale value of the sub-pixel, because the grayscale value of the sub-pixel is an integer, therefore, when a calculated grayscale value is a non-integer, the nearest integer to the non-integer is taken as the grayscale value of the sub-pixel.

For example, in an example, in a case where the texture type of the display image is the render texture type, the step S403 may comprise the following steps:

S4031: converting the texture type of the display image to obtain an intermediate display image, a texture type of the intermediate display image being a two-dimensional texture type;

S4032: acquiring an intermediate composite region of the intermediate display image; and S4033: covering the brightness pixel image on the intermediate composite region to obtain the output image.

It should be noted that, in the above step S301, the intermediate display image has been obtained according to the display image, and the intermediate display image is stored in the CPU, therefore, in the step S4031, the intermediate display image stored in the CPU can be directly obtained. In a case where the intermediate display image is not stored in the CPU, then in the step S4031, the step of converting the display image into the intermediate display image can be performed again, that is, performing the step of converting the texture type of the display image to obtain the intermediate display image.

For example, a size of the intermediate composite region may be the same as the size of the brightness pixel image. However the present disclosure is not limited thereto, the size of the intermediate composite region may be also larger than the size of the brightness pixel image.

For example, in an example, covering the brightness pixel image on the intermediate composite region of the intermediate display image to obtain the output image may comprise: placing the brightness pixel image on a first layer; placing the intermediate display image on a second layer, the first layer being located above the second layer; aligning the brightness pixel image with the intermediate composite region of the intermediate display image; composing the first layer and the second layer to obtain the output image. For another example, covering the brightness pixel image on the intermediate composite region of the intermediate display image to obtain the output image may comprise: replacing the intermediate composite region of the intermediate display image with the brightness pixel image, for example, grayscale values of respective pixels in the intermediate composite region of the intermediate display image are replaced with grayscale values of the corresponding brightness pixels of the brightness pixel image to obtain the output image.

It should be noted that, both the brightness pixel image and the intermediate display image are rendered images, and the brightness pixel image and the intermediate display image are both stored in the CPU.

For example, in the step S403, after the output image is obtained (at this time, the output image can be stored in the CPU), the output image can be sampled into the GPU and be stored in the GPU for subsequent operations.

Figure 5:
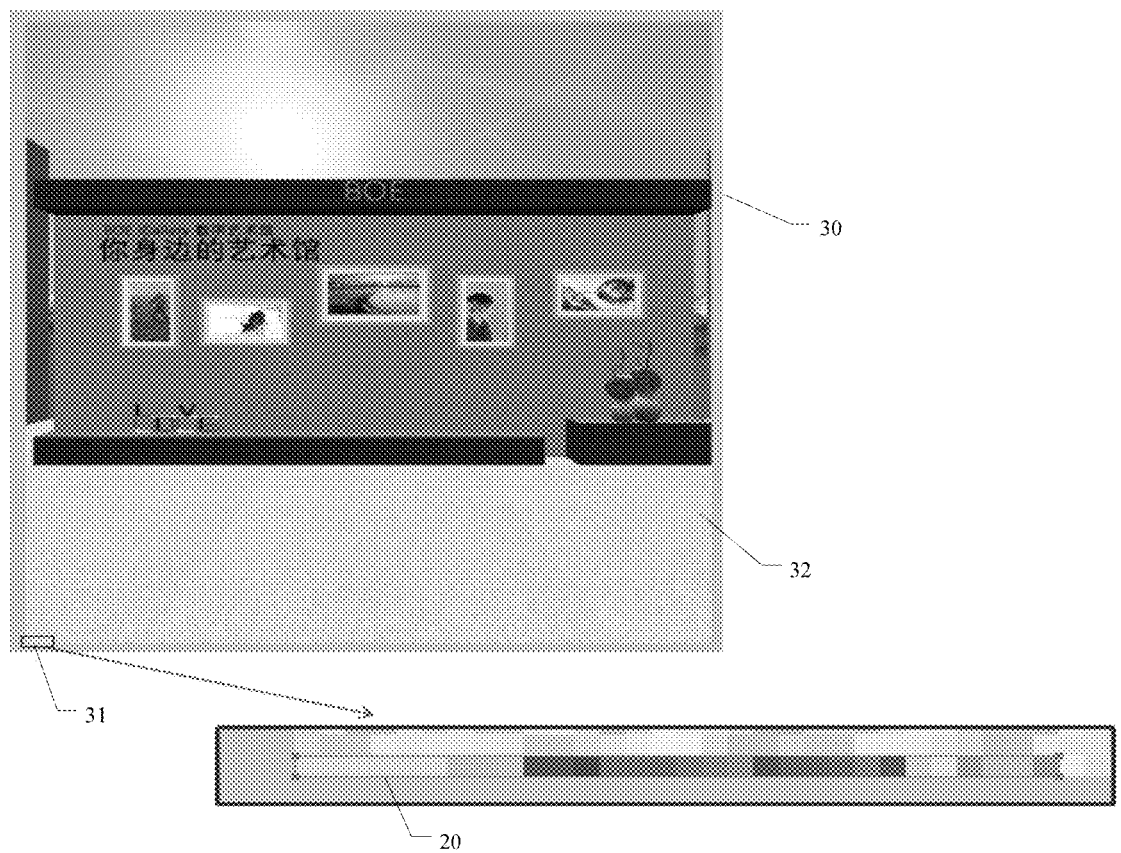
FIG. 5 is a schematic diagram of an output image according to an embodiment of the present disclosure.

FIG. 5 is a schematic diagram of an output image according to an embodiment of the present disclosure.

For example, the intermediate composite region may be located at an edge region of the intermediate display image, for example, at the lower right corner. However, the present disclosure is not limited thereto, according to actual situations, the intermediate composite region may be located in other regions of the intermediate display image, for example, in the lower left corner. For the intermediate display image, the size of the brightness pixel image is relatively small, the area of the intermediate composite region occupied by the brightness pixel image is also small, and the brightness pixel image covers the edge region of the intermediate display image, therefore, in actual applications, the brightness pixel image does not affect the display effect.

For example, the intermediate display image comprises a plurality of intermediate pixels, the output image comprises a plurality of output pixels. As shown in FIG. 5, the output image 30 may comprise a first region 31 and a second region 32, the first region 31 corresponds to the intermediate composite region of the intermediate display image. In a case where the intermediate composite region is located at the lower right corner of the intermediate display image, the first region 31 is also located at the lower right corner of the output image 30. The values of at least a portion of output pixels in the first region 31 are the same as the values of the respective brightness pixels 20 in the brightness pixel image. If the size of the intermediate composite region is the same as the size of the brightness pixel image, then the values of respective output pixels in the first region 31 are the same as and in one-to-one correspondence with the values of the respective brightness pixels 20 in the brightness pixel image. The values of respective output pixels in the second region 32 are the same as the values of the respective intermediate pixels at the corresponding positions in the intermediate display image.

It should be noted that, "values of respective pixels" indicate the grayscale values of the respective sub-pixels in the respective pixels. "Output pixel" represents a pixel in the output image.

For example, a size of the output image is the same as a size of the intermediate display image.

For example, in some embodiments, the backlight brightness processing method further comprises outputting the output image. In the operation of outputting the output image, the output image comprises values of a portion of the intermediate pixels in the intermediate display image and values of all brightness pixels in the brightness pixel image. Therefore, the backlight brightness processing method provided by the embodiment of the present disclosure can transmit the calculation result of the local backlight brightness together with the original display image to a hardware device (for example, a display or the like).

For example, in some other examples, in a case where the texture type of the display image is a texture2D type, the step S403 may comprise the following steps: acquiring an initial composite region of the display image; and covering the brightness pixel image on the initial composite region to obtain the output image.

For example, a size of the initial composite region is the same as a size of the brightness pixel image, and the size of the output image is the same as the size of the display image.

It should be noted that, in case of no conflict, for the specific operation of covering the brightness pixel image on the initial composite region to obtain the output image, reference may be made to the above-described operation of covering the brightness pixel image on the intermediate composite region to obtain the output image, and the repeated portions are not described herein again.

Figure 6:
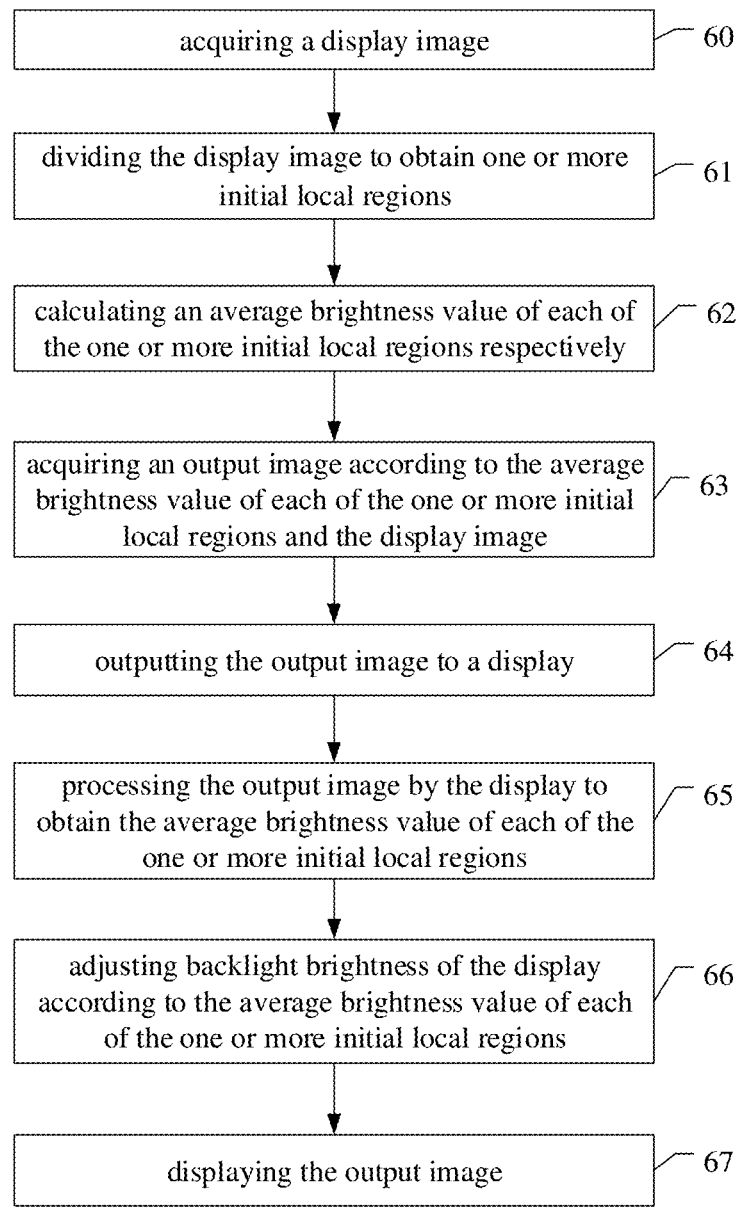
FIG. 6 is a schematic flowchart of a backlight brightness adjustment method according to an embodiment of the present disclosure.

An embodiment of the present disclosure further provides a backlight brightness adjustment method. FIG. 6 is a schematic flowchart of a backlight brightness adjustment method according to an embodiment of the present disclosure. The backlight brightness adjustment method may comprise the backlight brightness processing method described in any one of the above embodiments. In one example, as shown in FIG. 6, the backlight brightness adjustment method may comprise the following steps:

S60: acquiring a display image;

S61: dividing the display image to obtain one or more initial local regions;

S62: calculating one or more average brightness values of the one or more initial local regions respectively;

S63: acquiring an output image according to the one or more average brightness values of the one or more initial local regions and the display image;

S64: outputting the output image to a display;

S65: processing the output image by the display to obtain the one or more average brightness values of the one or more initial local regions;

S66: adjusting backlight brightness of the display according to the one or more average brightness values of the one or more initial local regions; and S67: displaying the output image.

For example, the above steps S6-S64 are all implemented in the rendering engine, and the steps S65-S67 are implemented in the display. Therefore, the backlight brightness adjustment method provided by the embodiment of the present disclosure can implement the calculation of the local backlight brightness on the rendering engine end, then transmit the calculation result of the local backlight brightness together with the original display image to the display end, and then the display adjusts the backlight brightness according to the calculation result of the local backlight brightness, thereby reducing power consumption, improving contrast, achieving real-time sampling and transmitting of the image, and satisfying the requirement of processing a large amount of data in real time in virtual reality technology. For example, according to the calculation result of the local backlight brightness of each local region, the display can adjust the backlight brightness of each local region, so that the backlight brightness of each local region is the same as the calculation result of the local backlight brightness of each local region.

For example, in the backlight brightness adjustment method, a detailed description of the respective steps S60-S64 performed in the rendering engine may be referred to the description of the backlight brightness processing method in the above embodiment. For example, for a detailed description of the step S60, reference may be made to the description of the step S10 above, for a detailed description of the step S61, reference may be made to the description of the step S20 above, for a detailed description of the step S62, reference may be made to the description of the step S30 above, and for a detailed description of the step S63, reference may be made to the description of the step S40 above.

For example, the display may be a virtual reality (VR) display or an augmented reality (AR) display, and the like, that is, the backlight brightness adjustment method can be applied to VR or AR, so as to reduce power consumption and improve contrast of the display image.

For example, the display may be a liquid crystal display, or the like. In the step S65, the display can extract the values of the output pixels, corresponding to the respective brightness pixels, in the output image, and converts the values of the output pixels corresponding to the respective brightness pixels into the average brightness values of the respective initial local regions.

For example, the step S66 may comprise: calculating backlight brightness of the respective initial local regions according to average brightness values of the respective initial local regions; and determining and adjusting backlight brightness of the display according to the backlight brightness of the respective initial local regions. The backlight brightness of the display corresponding to the respective initial local regions is the same as the calculated backlight brightness of the respective initial local regions.

For example, the display may comprise a display panel and a backlight source. The backlight source may be a direct type backlight source and be a dynamic backlight source. The backlight source can correspond to the entire display panel such that the backlight brightness of all sub-pixels in the pixels of the display panel can be adjusted.

For example, the backlight source may comprise a light-emitting unit array, and the light-emitting unit array comprises a plurality of light-emitting units arranged in an array, for example, these light-emitting units comprise a red light unit (R), a green light unit (G), and a blue light unit (B), and the red light unit (R), the green light unit (G), and the blue light unit (B) are combined together to emit white light. These light-emitting units may be light-emitting diodes (LEDs), such as inorganic LEDs or organic LEDs. At least part of these light-emitting units can be, for example, controlled individually.

Figure 7:
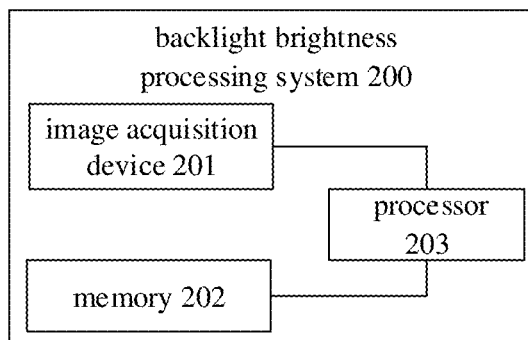
FIG. 7 is a schematic block diagram of a backlight brightness processing system according to an embodiment of the present disclosure.

An embodiment of the present disclosure further provides a backlight brightness processing system. FIG. 7 is a schematic block diagram of a backlight brightness processing system according to an embodiment of the present disclosure. For example, as shown in FIG. 7, the backlight brightness processing system 200 comprises an image acquisition device 201, a memory 202 and a processor 203. It should be noted that the components of the backlight brightness processing system shown in FIG. 7 are merely exemplary and are not limitative, according to the needs of the actual application, and the backlight brightness processing system may also have other components.

For example, the image acquisition device 201 is configured to acquire a display image; the memory 202 is configured to store non-transitory computer readable instructions; the processor 203 is configured to execute the non-transitory computer readable instructions. For example, when the non-transitory computer readable instructions are executed by the processor 203, one or more steps in the backlight brightness processing method described in any one of the above embodiments is performed.

For example, the image acquisition device 201, the memory 202, the processor 203, and the like may be disposed at the host side.

For example, the image acquisition device 201, the memory 202, the processor 203 may be interconnected by a bus system and/or other forms of connection mechanism (not shown).

For example, components such as the image acquisition device 201, the memory 202, the processor 203, and the like may communicate with each other directly or indirectly.

For example, the image acquisition device 201 may be a digital camera, a camera of a smart phone, a camera of a tablet computer, a camera of a personal computer, or even a web camera, so that the display image may be an image obtained by sampling the current scene by the image acquisition device 201. For example, the image acquisition device 201 may also comprise various software and/or hardware having data reading capabilities, so that the display image may be obtained by the image acquisition device 201 directly reading the image stored in the memory.

For example, the processor 203 may be a central processing unit (CPU) or other forms of processing unit having data processing capabilities and/or program execution capabilities, such as a field-programmable gate array (FPGA), or a tensor processing unit (TPU). The processor 203 may control other components in the backlight brightness processing system to perform desired functions. For another example, the central processing unit (CPU) may be an X86, ARM architecture, or the like.

For example, the memory 202 may comprise an arbitrary combination of one or more computer program products. The computer program products may comprise various forms of computer-readable storage media, such as volatile memory and/or non-volatile memory. The volatile memory may comprise, for example, a random access memory (RAM) and/or a cache or the like. The non-volatile memory may comprise, for example, a read only memory (ROM), a hard disk, an erasable programmable read only memory (EPROM), a portable compact disc-read only memory (CD-ROM), a USB memory, a flash memory, and the like. One or more computer instructions may be stored on the memory 202 and the processor 203 may execute the computer instructions to implement various functions. Various applications, various data, various data used and/or generated by the applications, and the like, may also be stored in the computer-readable storage medium.

It should be noted that, for a detailed description of calculating the average brightness values of the respective local regions on the display image by the backlight brightness processing system 200, reference may be made to the related description in the embodiment of the backlight brightness processing method, and the repeated descriptions are not described here again.

For example, in some embodiments, according to actual needs, the backlight brightness processing system may further comprise a display or the like. The display may be configured to: process the output image to obtain the average brightness values of the respective initial local regions; adjust the backlight brightness of the display according to the average brightness values of the respective initial local regions; and display the output image.

It should be noted that for a detailed description of the display, reference may be made to the related descriptions in the embodiment of the backlight brightness adjustment method described above, and the repeated descriptions are not described here again.

An embodiment of the present disclosure further provides a computer readable storage medium. For example, the computer readable storage medium can be used for storing non-transitory computer readable instructions. One or more non-transitory computer readable instructions may be stored on the computer readable storage medium. For example, a computer can perform one or more steps in the backlight brightness processing method described in any one of the above embodiments when executing the non-transitory computer readable instructions.

For example, the computer readable storage medium can be applied to the backlight brightness processing system described above. For example, the computer readable storage medium can be the memory 202 of the backlight brightness processing system 200 in the embodiment shown in FIG. 7.

For example, for a description of the computer readable storage medium, reference may be made to the description of the memory 202 in the embodiment of the backlight brightness processing system 200 shown in FIG. 7, and the repeated portions are not described here again.

For the present disclosure, the following statements should be noted:

(1) the accompanying drawings of the embodiment(s) of the present disclosure involve only the structure(s) in connection with the embodiment(s) of the present disclosure, and other structure(s) can be referred to common design(s); and (2) In case of no conflict, in case of no conflict, the embodiments of the present disclosure and the features in the embodiment(s) can be combined with each other to obtain new embodiment(s).

What have been described above are only specific implementations of the present disclosure, the protection scope of the present disclosure is not limited thereto, and the protection scope of the present disclosure should be based on the protection scope of the claims.

What is claimed is:

1. An image processing method, comprising:
acquiring a display image;
dividing the display image to obtain one or more initial local regions;
calculating an average brightness value of each of the one or more initial local regions respectively; and
acquiring an output image according to the average brightness value of each of the one or more initial local regions and the display image,
wherein acquiring the output image according to the average brightness value of each of the one or more initial local regions and the display image comprises:
creating a brightness pixel image according to a quantity of the one or more initial local regions;
storing the average brightness value of each of the one or more initial local regions in the brightness pixel image respectively; and
composing the brightness pixel image and the display image to obtain the output image, wherein a texture type of the display image is a render texture type, composing the brightness pixel image and the display image to obtain the output image comprises:

converting the texture type of the display image to obtain an intermediate display image, a texture type of the intermediate display image being a two-dimensional texture type;

acquiring an intermediate composite region of the intermediate display image; and covering the brightness pixel image on the intermediate composite region to obtain the output image.

2. The image processing method according to claim 1, wherein a size of the intermediate composite region is the same as a size of the brightness pixel image.

3. The image processing method according to claim 1, wherein the brightness pixel image comprises one or more brightness pixels, storing the one or more average brightness values in the brightness pixel image respectively comprises:

sequentially filling the one or more average brightness values into the one or more brightness pixels.

4. The image processing method according to claim 3, wherein sequentially filling the one or more average brightness values into the one or more brightness pixels comprises:

taking the one or more average brightness values as grayscale values of respective sub-pixels of the one or more brightness pixels respectively, and sequentially filling the one or more average brightness values into the respective sub-pixels of the one or more brightness pixels.

5. The image processing method according to claim 1, wherein calculating one or more average brightness values of the one or more initial local regions respectively comprises:

converting the texture type of the display image to obtain an intermediate display image, a texture type of the intermediate display image being a two-dimensional texture type;

dividing the intermediate display image according to the display image and the one or more initial local regions to obtain one or more intermediate local regions of the intermediate display image, the one or more initial local regions being in one-to-one correspondence with the one or more intermediate local regions; and calculating an intermediate average brightness value of each of the one or more intermediate local regions respectively, and the intermediate average brightness value of each of the one or more intermediate local regions being the average brightness value of each of the one or more initial local regions.

6. The image processing method according to claim 5, wherein the intermediate display image comprises a plurality of intermediate pixels, calculating the intermediate average brightness value of each of the one or more intermediate local regions respectively comprises:

acquiring intermediate pixel brightness values of respective intermediate pixels in each intermediate local region; and calculating the intermediate average brightness value corresponding to each intermediate local region according to the intermediate pixel brightness values of the respective intermediate pixels in each intermediate local region.

7. The image processing method according to claim 6, wherein each of the plurality of intermediate pixels comprises a red sub-pixel, a green sub-pixel, and a blue sub-pixel, a calculation formula of the intermediate pixel brightness value corresponding to each of the plurality of intermediate pixels is:

$$L=0.30\times r+0.59\times g+0.11\times b,$$

where r represents a grayscale value of the red sub-pixel of each of the plurality of intermediate pixels, g represents a grayscale value of the green sub-pixel of each of the plurality of intermediate pixels, b represents a grayscale value of the blue sub-pixel of each of the plurality of intermediate pixels, and L represents the intermediate pixel brightness value corresponding to each of the plurality of intermediate pixels.

8. The image processing method according to claim 6, wherein calculating the intermediate average brightness value corresponding to each intermediate local region according to the intermediate pixel brightness values of the respective intermediate pixels in each intermediate local region comprises:

averaging the intermediate pixel brightness values of all intermediate pixels in each intermediate local region to obtain the intermediate average brightness value corresponding to each intermediate local region; or selecting N intermediate pixels in each intermediate local region, and averaging the intermediate pixel brightness values of the N intermediate pixels selected in each intermediate local region to obtain the intermediate average brightness value corresponding to each intermediate local region, wherein N is a positive integer, and is less than a quantity of all intermediate pixels in each intermediate local region.

9. The image processing method according to claim 1, wherein a size of each of the one or more initial local regions is variable.

10. A backlight brightness adjustment method, comprising:

in a rendering engine:

performing the image processing method according to claim 1;

in a display:

processing the output image by the display to obtain the average brightness value of each of the one or more initial local regions;

adjusting backlight brightness of the display according to the average brightness value of each of the one or more initial local regions; and displaying the output image.

11. The backlight brightness adjustment method according to claim 10, wherein the display is a virtual reality display or an augmented reality display.

12. The backlight brightness adjustment method according to claim 10, wherein adjusting backlight brightness of the display according to the average brightness value of each of the one or more initial local regions comprising:

calculating a backlight brightness value corresponding to each of the one or more initial local regions according to the average brightness value of each of the one or more initial local regions; and adjusting backlight brightness of the display according to the backlight brightness value corresponding to each of the one or more initial local regions.

13. An image processing system, comprising:
- an image acquisition device, configured to acquire a display image;
- a memory, configured to store non-transitory computer readable instructions;
- a processor, configured to execute the non-transitory computer readable instructions, wherein when the non-transitory computer readable instructions are executed by the processor, the image processing method according to claim 1 is performed.

14. A non-transitory computer readable storage medium, used for storing non-transitory computer readable instructions, wherein when the non-transitory computer readable instructions are executed by a computer, the image processing method according to claim 1 is performed.

15. An image processing method, comprising:
- acquiring a display image;
- dividing the display image to obtain one or more initial local regions;
- calculating an average brightness value of each of the one or more initial local regions respectively; and
- acquiring an output image according to the average brightness value of each of the one or more initial local regions and the display image,
- wherein acquiring the output image according to the average brightness value of each of the one or more initial local regions and the display image comprises:
- creating a brightness pixel image according to a quantity of the one or more initial local regions;
- storing the average brightness value of each of the one or more initial local regions in the brightness pixel image respectively; and
- composing the brightness pixel image and the display image to obtain the output image,
- wherein a texture type of the display image is a two-dimensional texture type,
- composing the brightness pixel image and the display image to obtain the output image comprises:
- acquiring an initial composite region of the display image; and
- covering the brightness pixel image on the initial composite region to obtain the output image.

16. The image processing method according to claim 15, wherein a size of the initial composite region is the same as a size of the brightness pixel image.

17. The image processing method according to claim 15, wherein
- calculating the average brightness value of each of the one or more initial local regions respectively comprises:
- acquiring initial pixel brightness values of a plurality of initial pixels in each initial local region; and
- calculating the average brightness value corresponding to each initial local region according to the initial pixel brightness values of the plurality of initial pixels in each initial local region.

18. The image processing method according to claim 17, wherein calculating the average brightness value corresponding to each initial local region according to the initial pixel brightness values of the plurality of initial pixels in each initial local region comprises:
- averaging the initial pixel brightness values of all initial pixels in each initial local region to obtain the average brightness value corresponding to each initial local region; or
- selecting N initial pixels in each initial local region, and averaging the initial pixel brightness values of the N initial pixels selected in each initial local region to obtain the average brightness value corresponding to each initial local region, wherein N is a positive integer, and is less than a quantity of all initial pixels in each initial local region.

* * * * *